United States Patent [19]

Egashira et al.

[11] Patent Number: 5,336,660
[45] Date of Patent: Aug. 9, 1994

[54] HEAT TRANSFER

[75] Inventors: Noritaka Egashira, Ichikawa; Yoshikazu Ito, Setagaya; Tatsuya Kita, Shinjuku; Masahisa Yamaguchi, Nerima; Masaki Kutsukake, Fujimi; Kazunobu Imoto, Kita, all of Japan

[73] Assignee: Dai Nippon Insatsu Kabushiki Kaisha, Japan

[21] Appl. No.: 159,499

[22] Filed: Nov. 30, 1993

Related U.S. Application Data

[63] Continuation of Ser. No. 5,806, Jan. 19, 1993, Pat. No. 5,292,710, which is a continuation of Ser. No. 798,354, Nov. 21, 1991, Pat. No. 5,210,068, which is a continuation of Ser. No. 612,994, Nov. 15, 1990, abandoned, which is a continuation of Ser. No. 168,908, Mar. 16, 1988, Pat. No. 5,001,106.

[30] Foreign Application Priority Data

Mar. 20, 1987 [JP] Japan .................. 62-66879
Mar. 20, 1987 [JP] Japan .................. 62-66880

[51] Int. Cl.$^5$ ............... B41M 5/035; B41M 5/38
[52] U.S. Cl. ................... 503/227; 428/195; 428/913; 428/914
[58] Field of Search .......... 8/471; 428/195, 913, 428/914; 503/227

[56] References Cited

U.S. PATENT DOCUMENTS

| | | |
|---|---|---|
| 4,642,654 | 2/1987 | Toganoh et al. . |
| 4,720,480 | 1/1988 | Ito et al. ............ 503/227 |
| 4,778,782 | 10/1988 | Ito et al. . |
| 4,923,846 | 5/1990 | Egashira et al. ............ 503/227 |

FOREIGN PATENT DOCUMENTS

| | | |
|---|---|---|
| 0083079 | 7/1983 | European Pat. Off. . |
| 0234563 | 9/1987 | European Pat. Off. . |
| 3239187 | 5/1983 | Fed. Rep. of Germany . |
| 3239198 | 5/1983 | Fed. Rep. of Germany . |
| 60-245593 | 12/1985 | Japan . |
| 61-164892 | 7/1986 | Japan . |
| 61-197282 | 9/1986 | Japan . |
| 61-186471 | 11/1986 | Japan ................. 503/227 |
| 61-186473 | 11/1986 | Japan . |
| 61-188866 | 11/1986 | Japan . |
| 2148292 | 7/1987 | Japan . |

OTHER PUBLICATIONS

Patent Abstracts of Japan, vol. 12, No. 169(M-699)(3016) May 20, 1988 & JP-A-62 282 967 (Canon K.K.) Dec. 8, 1987.
Patent Abstracts of Japan, vol. 12, No. 169 (M-699)(3016) May 20, 1988 & JP-A-62 282 968 (Canon K.K.) Dec. 8, 1987.

*Primary Examiner*—B. Hamilton Hess
*Attorney, Agent, or Firm*—Parkhurst, Wendel & Rossi

[57] ABSTRACT

An image-receiving sheet comprising a base sheet and a receiving layer, provided on one surface of said base sheet, for receiving a dye or a pigment migrating from a heat transfer sheet, said base sheet comprising one or two or more layers, at least one layer of said base sheet having a porous structure or a foamed structure.

2 Claims, 2 Drawing Sheets

HEAT TRANSFER

This application is a Rule 60 continuation of application Ser. No. 08/005,806 filed Jan. 19, 1993, now U.S. Pat. No. 5,292,710, which in turn is a Rule 60 continuation of Ser. No. 07/798,354 filed Nov. 21, 1991, now U.S. Pat. No. 5,210,068, which in turn in a Rule 62 continuation application of Ser. No. 07/612,994, filed Nov. 15, 1990, now abandoned, which is a Rule 60 continuation application of Ser. No. 07/168,908, filed Mar. 16, 1988, now U.S. Pat. No. 5,001,106.

BACKGROUND OF THE INVENTION

This invention relates to an image-receiving sheet which is used in combination with a heat transfer sheet, for performing recording corresponding to information by heat transferring the dye or pigment in the heat transfer sheet.

The heat transfer recording system has been widely utilized as the recording system in a printer such as that in a computer, word processor, and other devices. In recent years, attempts have been made to use a heat-transfer sheet having a heat transfer layer containing a sublimatable dye provided on the surface of a substrate such as polyethyleneterephthalate in combination with an image-receiving sheet and perform overlayed recording of cyan, magenta, yellow, etc. thereby to accomplish recording of images of natural color photographic tones on said image-receiving sheet. This technique is being utilized in the case of, for example, recording an image directly on a CRT display.

As such image-receiving sheets, those with a construction having a receiving layer provided on the surface of a resin with high heat resistance such as polyethyleneterephthalate, non-foamed film of polypropylene type resin, or a synthetic paper using a polyolefin type resin or a polystyrene type resin as the base material have been known in the art.

However, an image-receiving sheet using polyethyleneterephthalate, etc., as the substrate may incur a lowering in its transferred image density due to high rigidity and low thermal insulating property of the substrate, and yet sometimes smooth sheet delivery may not be obtained. Consequently, there have been the drawbacks such as printing drift or color drift occurring when overlayed printing is repeated several times as in color printing, whereby transferred images of high sharpness could not be obtained.

Also, while printing according to the heat transfer system has been done by means of a heating printing means such as a thermal head, since the heat during transfer is applied only from one direction of the sheet in the image-receiving sheet of the prior art, the substrate of the image-receiving sheet curls so that the receiving layer side is on the concave inner side, thus resulting in the drawback of poor transfer.

Further, after a desired image has been once transfer recorded on a receiving layer by heating the heat transfer sheet as described above by means of a thermal head, the image may be transferred onto a transferable article such as telephone card in some cases. When used as transferred on a transferable article, a transparent image-receiving layer is provided on a transparent substrate, and after forming, for example, a reverse image on the image-receiving layer, heat transfer is carried out directly on an article, or through an adhesive sheet in the case of a cloth or the like. The transparent substrate may be permitted to remain as it is on the article to provide a protective layer or, alternatively, it may be peeled off to make the image-receiving layer the protective layer.

However, with a sheet having only a transparent receiving layer provided on a transparent substrate, there is the problem of difficulty of detecting the state of sheet delivery in the heat transfer device. Further, in transparency of the prior art, a support comprising a polyethyleneterephthalate film, or the like containing generally titanium white, etc. has been used as laminated, freely peelable on the back surface of the substrate for the purpose of reinforcement of the sheet. Thus, in the image-receiving sheet for transfer onto a transferable article having a support in laminated state on the substrate back surface, the transparent substrate is generally as thin as about 6 to $25\mu$, but since the image-receiving sheet is further laminated on the back surface with a support comprising a non-foamable resin, the rigidity as a whole becomes too high.

For this reason, the actual contact dot area between the heat transfer sheet and the image-receiving sheet becomes smaller as compared with the dot area heated by a thermal head. As the result, the density of the transferred image is low, and yet delivery of the image-receiving sheet during heat transfer in the transfer device cannot be conducted smoothly by means of the transfer device, whereby there has been the problem of printing drift or color drift in the case of performing overlayed transfer repeatedly as in color transfer.

SUMMARY OF THE INVENTION

The present invention has been accomplished in view of the above points and is intended to provide an image-receiving sheet which has high printing density and yet is free from printing drift, color drift, and other drawbacks.

Another object of the present invention is to provide an image-receiving sheet which can perform sheet delivery in a transfer device smoothly and yet without the possibility of incurring deleterious influence or curling by the heat applied during transfer.

DETAILED DESCRIPTION OF THE INVENTION

Figure 1:
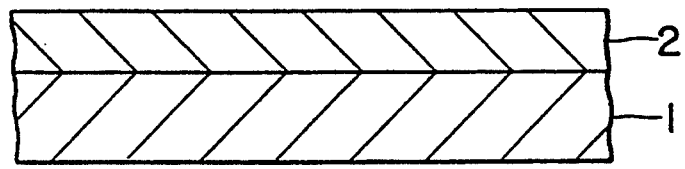
FIGS. 1 through 5 are sectional views respectively showing specific examples of the image-receiving sheet of the present invention, FIG. 3 being a sectional view showing the state of transferring an image by the use of the image-receiving sheet of the present invention to a specific article.

Referring now to the drawings, preferred embodiments of the present invention will now be described.

As shown in the sectional view in FIG. 1, the first embodiment of the image-receiving sheet of the present invention has a receiving layer 2 on the surface of a base sheet 1 having a porous structure or a foam structure.

Figure 2:
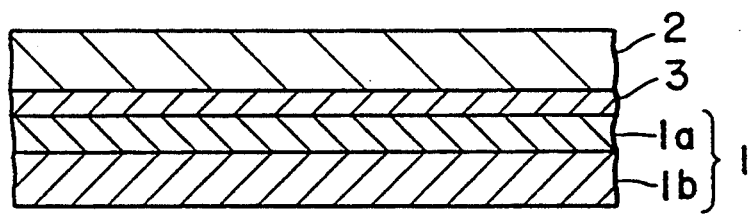

In the example shown in FIG. 2, the base sheet 1 comprises a substrate 1a and a support 1b. Further, in this example, an intermediate layer 3 is formed between the base sheet 1 and the receiving layer 2.

The constitution and the materials of the image-receiving sheet of the present invention will first be described in detail primarily with respect to these examples.

Base Sheet

In the present invention, the base sheet comprises one or two or more layers, and at least one layer of the base sheet has a porous structure or a foam structure. The material having a porous or foam structure can be obtained according to, for example, such methods as described below.

(a) The method in which a thermoplastic resin is stretched with addition of inorganic or organic fine particles, whereby voids are generated around the fine particles.

(b) The method in which an organic solvent solution of a synthetic resin is extruded through an orifice, and then introduced into a coagulating bath to cause coagulation by desolventization, whereby voids are generated through elimination of the solvent.

(c) The method in which a resin is extruded together with a foaming agent to carry out extrusion foaming.

As the base sheet, laminated products of these materials can be also used. When produced according to the method of (c), those with small cell sizes are particularly preferred.

As the material for the base sheet, one having high heat resistance such as a polyester (e.g., polyethyleneterephthalate), an aliphatic polyamide (e.g., 6-nylon), an aromatic polyamide, polycarbonate, polyallylate, polyether, polyethersulfone, polyether ether ketone, polyether imide and polyimide are preferred, but it is also possible to use polyolefins such as polyethylene and polypropylene, polyvinyl chloride, polyvinylidene chloride, polyvinyl alcohol, acrylic resins, cellulose resins, styrene resins, ethylene-vinyl acetate copolymer, ethylene-vinyl alcohol copolymer, ionomer, etc.

The thickness of the base sheet is preferably of the order of 50 to 200 $\mu$m. As to the density of the base sheet 1 (density of the weight per 1 m$^2$ divided by the thickness), it is preferably 90% or less, particularly 80% or less, and 50% or more, relative to the density of the non-foamed product of the same material, for improvement of printing quality and maximum heat insulating effect.

As shown in FIG. 2, in the present invention, the base sheet can be made as a laminate of the substrate 1a and the support 1b, and in this constitution, by providing the support 1b, an excellent effect for improvement of delivery performance of the sheet in the transfer device for sheet is exhibited. As the support 1b, a synthetic resin film, a white synthetic resin film containing a pigment such as titanium white, etc., a cellulose fiber paper such as a coated paper or cast coated paper is used, and as the above synthetic resin, the same resins as those for the substrate 1a can be employed, but other resins may also be employed. When the support 1b is constituted of a synthetic resin film or a white synthetic resin film, it may be constituted of either the same material resin as the substrate 1 or a different material resin.

If the support 1b is laminated in a freely peelable state with the substrate 1a, the delivery performance of the sheet in the transfer device during transfer can be improved, and also a procedure such as peeling after transfer is possible. For laminating the support 1b as in a freely peelable manner with the substrate 1a, it is possible to employ the method in which both are caused to adhere with a weak tackifier or the method in which the support 1b surface is subjected to a release treatment, and the substrate 1a is coated on the receiving layer non-forming surface with a strong tackifier, a heatsensitive adhesive, etc. and dried before being caused to adhere. In the latter method, the substrate 1a from which the support is peeled off (the receiving layer having already an image transferred thereon) can also be used as the label attached with the tackifier. Also, the support 1b can have a detection mark for positioning in the transfer device during heat transfer printing. Further, on the back of the support 1b, for improvement of paper passage, a lubricating layer comprising an acrylic resin, methacrylic resin, etc. or an antistatic layer such as a surfactant can be formed.

The support 1b, when used for a use such as transferring the transferred image further to another image-receiving member 15, will be finally peeled off from the substrate 1a.

Figure 3:
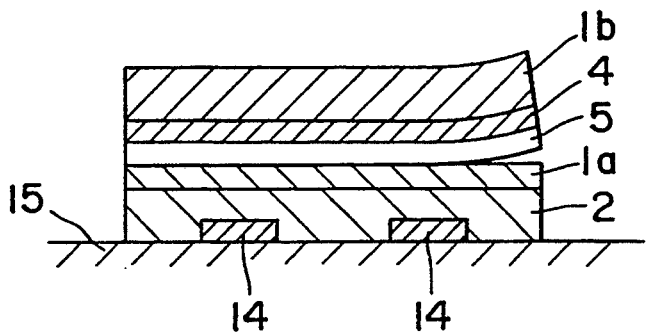

FIG. 3 indicates the manner in which transfer is carried out onto an image-receiving member 15 such as a card, reference numeral 14 designating an image, 4 a primer, and 5 a weak tackifier layer.

Image-receiving sheets to be used by transfer onto articles such as cards and fabrics are generally of the following two types.

(I) A plastic film such as polyethyleneterephthalate is subjected to a primer treatment, if necessary, and an image-receiving layer is provided thereon. The silicone which is the release agent on the image-receiving surface is cured. On the other hand, on one surface of the foamed polyethyleneterephthalate which is the support, a slip layer for making delivery within the printer smooth is provided and provided with mark printing, if necessary, while on the opposite surface is applied a primer treatment, if necessary, followed by coating of a weak tackifier thereon. The transparent substrate provided with the above image receiving layer, at its surface having no image-receiving layer, is caused by pressure to adhere with a weak tackifier thereby to provide an image-receiving sheet. A sublimatable dye image (ordinarily reverse image) is formed at the image-receiving surface of the image-receiving sheet, and the image-receiving surface is caused by hot pressurization with hot rollers to adhere onto an article made readily adherable by primer treatment, for example, the primer treated surface of a card substrate. The support can be peeled off together with the weak tackifier to obtain a decorated article. In this case, the film such as transparent polyethyleneterephthalate becomes the protective layer to improve the storability of the card. Particularly, when storability is important, it is desirable to add a photostabilizer, etc., internally of the transparent film and/or the image receiving layer.

(II) Alternatively, for making the support readily peelable, in place of using the weak tackifier as described above, an image-receiving sheet with the following constitution can be also made. That is, on a smooth film of polyethyleneterephthalate, a peeling layer is formed and an image-receiving layer is provided thereon. In this case, the sheet assembly is so designed that the adhesive force between the peeling layer and the smooth film will be weaker than the adhesive force between the peeling layer and the image-receiving layer. On the other hand, the surface of the foamed polyethyleneterephthalate which is the support, on which no slip layer is provided, is subjected to a primer treatment, if necessary, coated with an adhesive, and caused to adhere by contacting the surface having no image-receiving layer of the smooth film provided with the above image-receiving layer with the adhesive. After formation of a sublimating dye image on the image-receiving surface, heat transfer is effected on an article similarly as described above to make a decorative article. In this case, the image-receiving layer or the peeling layer functions as protection of the image.

In either of the cases (I) and (II), the transparent plastic sheet or the smooth plastic film is preferably on the thinner side so that the cushioning characteristic of the foamed polyethyleneterephthalate which is the support will contribute to the effect, and a film with a thickness of about 6 to 25 μm is generally used.

The image-receiving sheet of the present invention, by the use of a base sheet comprising a material having a porous or foamed structure, can produce a transferred image with high density by the cushioning action and heat insulating action of the base sheet, and can also obtain smooth delivery of the image-receiving sheet in the transfer device, whereby there is no possibility of printing slippage due to irregularity of delivery or color drift during color transfer. Yet there is also no possibility of curling of the substrate by heating during printing, thus producing the excellent effect of obtaining a clear and good transferred image.

Receiving Layer

For the receiving layer, it is desirable to use a resin having dyeability with respect to a sublimatable dye and weathering resistance. Specifically, the following examples may be included.

(1) Saturated polyester resin, polyurethane resin, polystyrene resin, polyamide resin, vinyl chloride resin, vinyl chloride-vinyl acetate copolymer resin, copolymer of vinyl chloride and acylic acid type monomer, polyvinyl acetate, polycarbonate resin, epoxy resin, and ethylenevinyl acetate type resin. Among these, copolymers of vinyl chloride-acrylic acid type monomer and polyamide resin are particularly preferred. Also, a resin composition composed mainly of vinyl chloride can be formed into a film according to the film forming processing method such as the calendering method and used as the receiving layer, which can be used particularly with a foamed sheet caused to adhere thereon or adhere in a freely peelable state and is particularly suitable for OHP, labels, etc.

(2) When a copolymer of vinyl chloride with an acrylic acid type monomer is used as the resin for the receiving layer, a receiving layer having good dyeability as well as weathering resistance can be obtained.

Examples of acrylic acid type monomers are acrylates such as methyl acrylate, ethyl acrylate, 2-ethylhexyl acrylate, 2-hydroxyethyl acrylate, and trimethylolpropane triacrylate; methacrylates such as methyl methacrylate, t-butyl methacrylate, triethyleneglycol dimethacrylate, and trimethylolpropane methacrylate; acrylic acid or methacrylic acid and acrylic acid metal salts.

As acrylates, those having a functional group, particularly acrylates or methacrylates having a hydroxyl group in the side chain are desirably used because dyeability can be remarkably enhanced.

The copolymerization ratio of vinyl chloride to an acrylic acid type monomer is desirably vinyl chloride/acrylic acid type monomer=50 to 90%/50 to 10%, and its molecular weight is 5,000 to 40,000, preferably 10,000 to 30,000.

Also, it is possible to use a copolymer of vinyl chloride and an acrylic acid type monomer copolymerized with other monomers such as acrylonitrile, vinyl pyrolidone, N-substituted maleimide, maleic acid, etc. In this case, the copolymerization ratio of other monomers is desirably of the order of 0.1 to 30%.

(3) As the receiving layer resin, a resin having an amide bond (NH—CO—) or a modified resin which is a derivative of said resin may be also used.

The resin having an amide bond is obtained by, for example, polycondensation of a dicarboxylic acid compound and a diamine compound. Examples of these dicarboxylic acids and diamines are as follows.

(A) Dicarboxylic Acids

①  aliphatic dicarboxylic acids such as oxalic acid, malonic acid, succinic acid, oleic acid, maleic acid, adipic acid, eraidic acid, azelaic acid, sebacic acid, eicosanic diacid, and linoleic acid, and derivatives thereof;

② alicyclic dicarboxylic acid such as cyclopropane dicarboxylic acid, cyclohexane carboxylic acid, and bicyclooctane dicarboxylic acid, and derivatives thereof;

③ aromatic dicarboxylic acids such as phthalic acid, naphthalene dicarboxylic acid, biphenyl dicarboxylic acid, and isopropylidene dibenzoic acid, and derivatives thereof;

④ dicarboxylic acids such as oxaadipic acid, methyl 9-oxabicyclo[3,3,1]nonane-2,6-dicarboxylate, and 4,5-imidazole carboxylic acid, and derivatives thereof, and also dimers (dimeric acids) of linoleic acid, oleic acid, eraidic acid, and tall oil fatty acid.

(B) Diaminegg Compounds

① diamines such as ethylenediamine, trimethylenediamine, tetramethylenediamine, diaminobutane, pentamethylenediamine, hexamethylenediamine, heptamethylenediamine, octamethylenediamine, decamethylenediamine, and dodecamethylenediamine, and derivatives thereof;

② diamines such as phenylenediamine, diaminotoluene, diaminophenol, and isophoronediamine, and derivatives thereof.

A receiving layer prepared by the use of these polyamide resins is particularly excellent in dyeability.

(4) The receiving layer may be formed by the use of a resin composition composed mainly of polyvinyl chloride. Such a resin is a resin composition containing 50% by weight or more of polyvinyl chloride, specific examples of which are homopolymers only of polyvinyl chloride; copolymers of vinyl chloride copolymerized with 5 to 30% of vinylidene chloride, or an acrylate; a blend resin of polyvinyl chloride blended with other resins such as ethylene-vinyl acetate.

The resin composition composed mainly of polyvinyl chloride can incorporate 5 to 60%, preferably 10 to 50%, by weight of a plasticizer. If the amount of the plasticizer added is less than 5% by weight, the image-receiving layer becomes rigid and dyeability of a dye during transfer will be lowered. On the contrary, if it exceeds 60% by weight, although dyeability can be improved, blurring of image is liable to occur with elapse of time, whereby storability of image for a long period is inferior. Examples of the plasticizer are phthalic acid esters, dibasic acid esters, polyhydric alcohol esters, fatty acid esters, epoxy. fatty acid esters having the function as the stabilizer, and polymeric plasticizers such as ethylene-vinyl acetate copolymer, used singly or as combinations of two or more kinds.

(5) The above receiving layer resin which can be mixed with each other can be used as a mixture. Also, another resin with good dye dyeability may also be used as a mixture with the above receiving layer resin.

Examples of the resin with good dye dyeability are resins of polyester type, polyurethane type, vinyl acetate type, polystyrene type, epoxy type, amino type, and ethylene-vinyl acetate type.

Formation of the receiving layer may be practiced with the use of a composition for formation of a receiving layer obtained by dissolving or dispersing the receiving layer resin in a solvent according to a known coating method or printing method. Otherwise, after a layer has been formed once on a temporary carrier separated from the foamed sheet substrate, it may then be transferred onto the foamed sheet substrate.

In the case of a resin composition composed mainly of polyvinyl chloride, a film formed by the film forming processing method such as the calendering method may be used as the receiving layer, and a foamed sheet may be caused to adhere on the opposite surface or to adhere in a freely peelable state to provide an image-receiving sheet.

In the composition for formation of receiving layer, for improvement of the weathering resistance of the transferred image, one or two or more kinds of UV-ray absorbers, photostabilizers or antioxidants, etc. may be added, if necessary. These additives should be added each in an amount of 0.05 to 10 parts by weight based on 100 parts by weight of the resin.

It is also possible to add a white pigment in the composition for formation of the receiving layer for the purpose of improving whiteness, shielding property of the receiving layer, or further imparting writability to the image-receiving sheet surface, etc. As the white pigment, titanium oxide, zinc oxide, kaolin clay, calcium carbonate, silica, etc. can be employed, and the amount of the white pigment is preferably 5 to 50 parts by weight based on 100 parts of the resin constituting the receiving layer.

When the receiving layer is white and its surface reflection characteristic is within a certain range, the degree of whiteness is high and the image transferred appears beautiful. Its desirable range .is such that the values of L, a and b as measured by the method defined by JIS-Z8722 and represented by the method defined by JIS-Z8730 are, respectively, L=90 or more, a=−1.0 to +2.0 and b=−2.0 to −5.0.

For falling within such a desirable range, it is necessary to incorporate a blue dye and a red dye other than the white pigment such as titanium oxide, and to incorporate further, if necessary, a fluorescent brightener, and control the respective contents. The above resin used in the receiving layer has a slightly yellow tint. By controlling the contents of these additives, good whiteness can be obtained. The amount of the white pigment added in the receiving layer is desirably 30% or less, particularly 10% or less based on the receiving layer resin. Accordingly, as the substrate coated with the receiving layer, one having values of L, a and b approximately in the above ranges is preferable, and particularly a foamed product of polyethyleneterephthalate is desirable.

The weight of the solvent in the receiving layer is desirably 1% or less of the weight of the solvent soluble components for forming the receiving layer. If the amount of the solvent remaining in the receiving layer is 1% or more, the solvent odor remains, and also the image tends to become obscure when stored for a long time after printing.

The thermoplastic resin for forming the receiving layer desirably has a glass transition point of 40° C. or higher. When the glass transition point is lower than 40° C., dyeability can be improved, but the dye received tends to migrate toward the overlapped sheet side to be retransferred, and also the dye received is subjected to migration, whereby the image becomes obscure.

Release Agent, Release Agent Layer

The image-receiving sheet of the present invention can contain a release agent in the receiving layer for enhancing releasability from the heat-transfer sheet. Examples of such a release agent are solid waxes such as polyethylene wax, amide wax, and Teflon powder, fluorine type, phosphoric acid ester type surfactants, and silicone oils, of which silicone oils are preferred.

As the above silicone oil, an oily one can be used, but a cured type oil is preferred. As the cured type silicone oil, the reaction cured type, the photocured type, the catalyst cured type, etc. may be used, but a silicone oil of the reaction cured type silicone oil is preferred. As the reaction cured type silicone oil, one obtained by the reaction curing of an amino-modified silicone oil and an epoxy-modified silicone oil is preferred. The amount of this cured type silicone oil is preferably 0.5 to 30 parts by weight based on 100 parts by weight of the resin constituting the receiving layer.

Also, a release agent layer can be provided by coating a part or all of the surface of the receiving layer with the above release agent dissolved or dispersed in an appropriate solvent and then drying the coating. As the release agent constituting the release agent layer, the reaction cured product of the amino-modified silicone oil and the epoxy-modified silicone oil as mentioned above is particularly preferred. The release agent layer should have a thickness of 0.01 to 5 pm, particularly 0.05 to 2 pm. The release agent layer may be provided on either a part of the surface of the receiving layer or the whole surface. When it is provided on a part of the receiving layer surface, dot impact recording, heat-sensitive melting transfer recording or recording with a pencil, etc. can be performed on the portion where no release agent layer is provided. It is also possible to perform the sublimating transfer recording operation by another recording mode, such as by performing sublimating transfer recording at the portion where the release agent layer is provided and recording according to another recording mode at the portion where no release agent is provided.

Further, in the present invention, in place of a silicone resin, fluorine resin, etc., or under a state of mixture with respective resins, a thin layer of the hot release agent as shown below may be also provided:

(a) a hot release agent comprising as the main component a polymer having an organopolysiloxane component in the main chain or the side chain of the polymer;

(b) a hot release agent comprising as the main component a polymer having a long-chain alkyl component in the side chain of the polymer.

Intermediate Layer

The intermediate layer 3 can be constituted of a resin such as a polyester, vinyl chloride-vinyl acetate copolymer, an acrylic resin, or polyvinyl acetate. By the provision of the intermediate layer, printing density can be further enhanced through its cushioning property.

The intermediate layer 3 is provided by coating a solution of the above resin dissolved in a solvent and drying the coating, or by melting and extrusion coating of the above resin.

Surface Roughening Treatment

In the present invention, the receiving layer on either its outer or front surface or the surface on the opposite side to the receiving layer forming surface can be suitably coated with an antistatic agent to prevent so-called "two-sheet feeding" during automatic paper feeding arising from electrostatic charges. However, when the effect of preventing two-sheet feeding only with the antistatic agent is insufficient, this problem can be solved by toughening at least a part of the surface of the image receiving sheet and/or the surface on the back side.

Particularly, when the substrate of the image-receiving sheet comprises a plastic sheet, a synthetic paper sheet or a laminate thereof with a cellulose fiber paper, and automatic sheet feeding is performed with the image-receiving sheets piled in a tray in the heat-sensitive printer, the image-receiving sheets tend to be delivered with two or more sheets in superposed state (so-called two-sheet feeding) to cause inconvenient sheet clogging even if an antistatic treatment has been applied on the surface of the sheets.

For solving this problem, it is desirable to roughen at least a part of both front and back surfaces of the image receiving sheet, for example, the non-image portion of the receiving surface or the back surface of the image-receiving sheet, by imparting fine unevenness thereto.

Label

Figure 4:
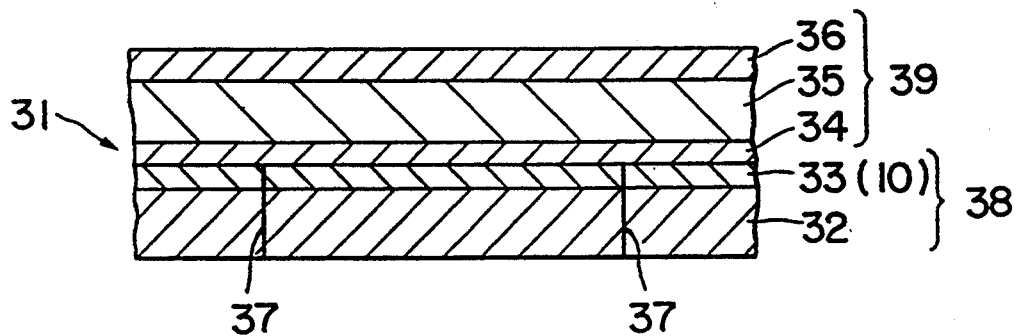

The image-receiving sheet 31 of the present invention may be one having a laminated structure, as shown in FIG. 4, comprising a release treatment layer 33, a tacky layer 34, a substrate 35 and a receiving layer 36 successively laminated on a support 32. In this figure, reference numeral 37 designates cutting lines made by a half-cut process.

Also, the above image-receiving sheet 31 has a structure which is peelable between a support portion 38, comprising the above support 32 and the release treatment layer 33, and an image-receiving sheet portion 39, comprising the tacky layer 34, the substrate 35 and the receiving layer 36.

The above image-receiving portion 39 is the portion to be released from the support portion 38 and stuck onto various articles and comprises a structure in which the receiving layer 36 is provided on the substrate 35, and the tacky layer 34 which enables adhering onto the surface of a desired article is secured to the back surface of the substrate 35.

The image-receiving sheet 31 is subjected to a half-cut process for providing cutting lines 37 extending through all of the layers constituting said support portion 38 or sheet portion 39, at specific positions of the support portion 38 or the image-receiving sheet portion 39 of the layer constitution comprising the laminated structure as shown in FIG. 4. The half-cut process is generally applied after the lamination working of the image-receiving sheet prior to transfer image recording by the use of a commercially available punching device, etc. by controlling the depth of the progress, but the half-cut process may also be applied after transfer image recording, and the number of cutting lines, kinds of lines, shapes drawn by the lined, etc. are suitably set.

When the half-cut process is applied at the support portion 38, after transfer image recording, the peeling operation for peeling the support portion 38 from the image-receiving sheet portion 39 can be done easily and rapidly. Also, in the case of this example, in sticking a layer preferably with a thin thickness onto a card or the like, if the support portion is removed by peeling all at once, only the image-receiving sheet with a thin thickness remaining becomes inconvenient in handling, whereby adequate sticking will be difficult. In such a case, by applying the half-cut process so as to peel off only the support portion corresponding to the image forming portion to be stuck (e.g. image is formed at the central portion of the sheet) and permit the support portion which becomes the remaining peripheral portion to remain, peeling can be done during sticking with only the support portion corresponding to said stuck portion, and the image-receiving portion can be supported by the remaining support portion to be handled very conveniently, whereby adequate sticking working can be done. In this case, after the image-receiving sheet portion has been stuck onto an article, the remaining support portion and the image-receiving sheet portion of said support portion are removed.

Figure 5:
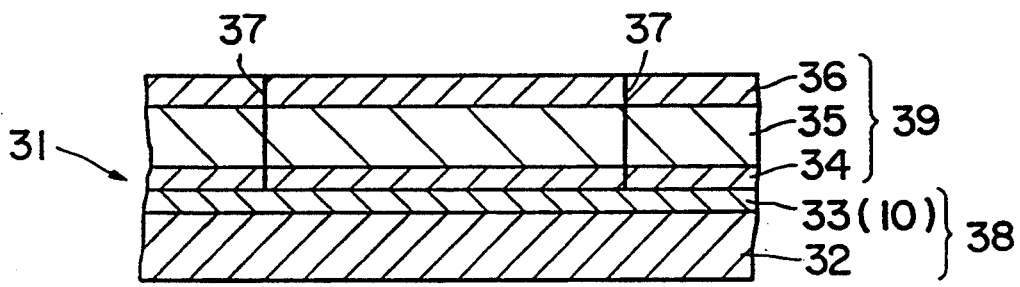

On the other hand, as shown in FIG. 5, when the image-receiving portion 39 is subjected to the half-cut process, the image-receiving sheet portion 39 can be sectionalized and, recording of desired transfer images carried out within the regions of the sections. Then the image-receiving sheet portion 39 within the section surrounded by the cutting line 37 can be released correctly and easily divided from the supporting portion 38.

Figure 6:
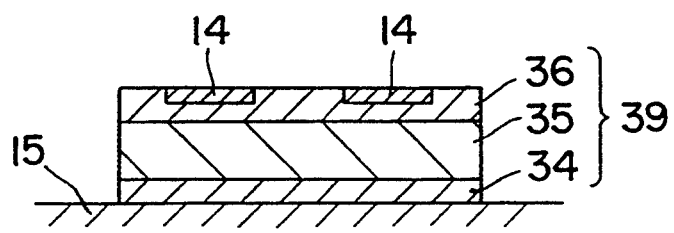
FIG. 6 is a sectional view showing the state of the image transferred to a specific article.

In practically using the image-receiving sheet 31 constituted as described above, it is combined with the heat transfer sheet, and through migration of the dye in the colorant layer in the heat transfer sheet by heating by a thermal head, etc. to the receiving layer 36 of the image-receiving sheet, a transferred image is formed on the image-receiving sheet. Then the image-forming sheet portion 39 is peeled off from the support portion 38 along the cutting line 37 by the half-cut process, which step is followed by sticking of the image-receiving sheet portion having the transferred image 14 formed thereon onto an intended article 15, as shown in FIG. 6. The article 15 may be any article, provided that the transferred image can be plastered thereon.

The image-receiving sheet having the above composition is suitable for a use in which a large number of face pictures are formed, subjected to half-cut for respective sections of the respective face pictures, and peeled off to be stuck onto name cards or various ID cards.

Detection Mark

For distinguishing whether the image-receiving sheet is the correct sheet to be used for the heat-sensitive transfer printer, and also, performing positional determination between the heat-transfer sheet and the image-receiving sheet, it is desirable to form a physically detectable detection mark on a part of the image-receiving sheet, ordinarily on the back surface of the sheet.

As a method for preparing the image-receiving sheet having the detection mark, each sheet obtained by cutting a sheet of the image-receiving sheet in a wound-up state is printed with a physically detectable mark at a position corresponding to a corner and/or a side, and then said sheet is cut to give an image-receiving sheet having a detection mark at the corner and/or the side.

Writing Treatment Layer

The image-receiving sheet of the present invention can have a writing treatment layer provided at a specific position on the receiving layer. The writing treatment layer refers to one on which writing with a pencil, a ball-point pen, a fountain pen, etc. or otherwise sealing, etc. can be done. By the provision of this layer, difficulty in writing, sealing, etc., because the receiving layer is generally constituted of a resin film surface, can be overcome, whereby comments, notes, etc. can be written freely on this layer. The writing treatment layer is formed by the use of a resin such as hydroxyethyl cellulose, polyvinyl acetate, or styrenemaleic acid copolymer which is mixed with calcium carbonate, silica, clay, etc.

Storability Enhancing Treatment of Image

In the present invention, for storability enhancement of the transferred image, a protective layer can be formed on the surface of the receiving layer.

As the material for such protective layer, there are plastic films such as those of polyethyleneterephthalate, polypropylene, and rigid vinyl chloride, which are laminated on the receiving layer having an image formed thereon through a heat-meltable sheet or an adhesive.

Instead of providing a protective layer, it is also possible to wrap the sheet with a plastic film such as one of rigid vinyl chloride, polypropylene or polyethyleneterephthalate, or to store the sheet in a case made of those films.

Also, in the present invention, after formation of a dye image on the receiving layer of the image-receiving sheet, the dye forming the image can be amply color formed and dyed by heating with heating means such as a thermal head, heating rolls or a laminator, whereby an image having excellent image density, light resistance, stain resistance, etc. can be provided.

Further, in the present invention, after formation of a dye image on the receiving layer of the image-receiving sheet having a receiving layer comprising an uncured or semi-cured curable resin, the receiving layer can be cured by application of an energy such as heat or ionizable radiation ..to impart long term storability to the dye image.

Uses

The image-receiving sheet of the present invention is applicable for hard copy making of an image recorded on a CRT picture face or an image recorded by a magnetic recording means, and may be used as it is after printing, or otherwise used after printing, with peel-off of the support. Alternatively, after printing, it can be caused to adhere with the printed surface pressed against an article on which it is to be transferred and then peeled off from the support before use.

Specific examples of uses are those as substitute products for printed matter, particularly printed matter for correction, and otherwise formation of face pictures of ID cards, formation of face pictures on name cards, picture attachments on telephone cards, premiums, postal cards, advertisements for windows, electric decorative signboards, various decorative articles, tags, labels for explanation of merchandise, labels for stationary articles, indices for audio cassettes or video cassettes, and other various uses.

Other Considerations

Ordinarily, image-receiving sheets are stored and handled in a state in which a large number of sheets are stacked. In this case, it is preferable that the image-receiving sheets stacked in a large number be packaged and sealed with a cover comprising a soft packaging material and yet have a structure such that one end of said cover can be readily broken to be removed. By making such a structure, in using practically this stack, the user can break one end of said package and set the image-receiving sheets on a sheet-feeding cassette with the remainder of the cover still intact, that is without touching the image-receiving sheets internally of the cover by hand, whereby infiltration of dust or grime can be prevented so far as possible.

Also, in using the image-receiving sheet of the present invention, it is possible to use a sheet-feeding cassette provided with a cassette case with a sealed structure which is detachable relative to the printer and houses internally image-receiving sheets, the image-receiving sheet take-out outlet having been made openable.

The user, in using the paper-feeding cassette, merely opens the take-out outlet and can set the cassette case on the printer as it is without touching the image-receiving sheets therein by hand, whereby infiltration of dust or grime into the sheet-feeding cassette or leaving of fingerprints on the image-receiving sheets can be prevented.

Also, in using the image-receiving sheets of the present invention, it is preferable to provide a box-shaped case for housing a large number of stacked image-receiving sheets, which case is provided on one end with a take-out outlet for image-receiving sheets, a dust removing means provided at said take-out outlet, and a dust removing means for removing dust from the recording sheet during take-out of the image-receiving sheet, such as a dust removing brush or a dust removing tape.

Further, the heat-sensitive transfer printer may also be provided with a means for removing dust on the image-receiving sheet. As the means for removing dust, tacky rolls and/or deelectrification rolls can be used.

In formation of images by means of the sublimation transfer method, the image reproductivity varies according to the quality of a heat transfer sheet or an image receiving sheet and the fluctuation of a printer itself. Therefore, in using the present invention, it is preferable to prepare a reference color in advance in order to know the variation of the reproductivity of images.

Such a reference color may be prepared separately with the image receiving sheet, or the reference color may be formed on the part of the image receiving sheet, preferably on the edge of the surface where a receiving layer is formed. The reference color comprises a thin and long color scale consisting divided small parts of color, e.g., yellow, cyan, magenta and black. This color scale has preferably the range from shadow to highlight in each color. In printing, another color scale (reference color) may be formed together with images. In this case, the color scale formed with images is compared with the previously formed color scale thereby to inspect the reproductivity of images formed by sublimation printing. Thus, the quality of the image receiving sheet and the heat transfer sheet and the fluctuation of the operation conditions of a printer can be judged by users.

According to the result of the above determination, users can change the heat transfer sheet or the image receiving sheet, or adjust the operation conditions of the thermal printer, thereby to enhance the image reproductivity.

The present invention is described in more detail below by way of specific Examples, in which quantities expressed in parts and % are by weight unless otherwise specifically noted.

EXAMPLE A-1

A porous polyethyleneterephthalate film having a density of about 73% relative to the density of the non-foamed polyethyleneterephthalate film (thickness 100μ, density 1.04, produced by Dialoil K.K., commercially available as [foamed white polyester film]) was used as the substrate, and after an urethane type primer was applied and dried on one surface of this substrate, a composition for formation of a receiving layer of the following composition was applied by a Myer bar and dried (coating amount after drying 6 g/m$^2$) to form a receiving layer, thus obtaining an image-receiving sheet.

| Compostition for forming receiving layer | |
|---|---|
| Polyester resin (Vylon 200, produced by Toyobo, Japan) | 70 parts |
| Polyester resin (Vylon 290, produced by Toyobo, Japan) | 30 parts |
| Amino-modified silicone (KF-393: produced by Shinetsu Kagaku Kogyo, Japan) | 5 parts |
| Epoxy-modified silicone (X-22-343: produced by Shinetsu Kagaku Kogyo, Japan) | 5 parts |
| Methyl ethyl ketone | 350 parts |
| Toluene | 350 parts |

On the other hand, with the use of a polyester film with a thickness of 4.5μ (Lumilar: .produced by Toray, Japan) having a heat-resistant lubricating layer comprising a thermosetting acrylic resin provided on one surface as the substrate, the ink compositions for formation of heat transfer layer with the following compositions were applied on the substrate on the surface on the side where the heat-resistant lubricating layer was provided and the opposite side each to a coated amount after drying of 1 g/m$^2$ to obtain a heat transfer sheet.

| Cyan ink composition for formation of heat transfer layer | |
|---|---|
| Disperse dye (Kayaset Blue 714, produced by Nippon Kayaku, Japan) | 5 parts |
| Polyvinyl butyral resin (Ethlec BX-1, produced by Sekisui Kagaku, Japan) | 4 parts |
| Methyl ethyl ketone | 46 parts |
| Toluene | 45 parts |
| Magenta ink composition for formation of heat transfer layer | |
| Disperse dye (MS Red G: produced by Mitsui Toatsu Kagaku, Japan) (Disperse Red 60) | 2.6 parts |
| Disperse dye (Macrolex Violet R: produced by Bayer) (Disperse Violet 26) | 1.4 parts |
| Polyvinyl butyral resin (Ethlec BX-1: produced by Sekisui Kagaku, Japan) | 4.3 parts |
| Methyl ethyl ketone | 45 parts |
| Toluene | 45 parts |
| Yellow ink composition for formation of heat transfer layer | |
| Disperse dye (Macrolex Yellow 6G: produced by Bayer) (Disperse Yellow 201) | 5.5 parts |
| Polyvinyl butyral resin (Ethlec BX-1, produced by Sekisui Kagaku, Japan) | 4.5 parts |
| Methyl ethyl ketone | 45 parts |
| Toluene | 45 parts |

By the use of the heat transfer sheet together with the above image-receiving sheet, printing was performed by means of a color video printer: VY-50 (produced by Hitachi Seisakusho) under the conditions shown below, and the reflective density of cyan was measured by a Macbeth color densitometer RD-918 to be 1.95. Also, the printing density was found to be uniform over the entire printed surface, and good transfer image could be obtained, without drop-out of dot being observed, with high printing densities for all of the three colors, without coarseness, color drift of the three colors or ground irregularity. Further, by controlling the electrical energy applied on the head by varying the pulse width, any desired printing density could be obtained with good reproducibility.

| Printing conditions | |
|---|---|
| Printing speed: | 33.3 ms/line |
| Delivery pitch: | 0.166 mm |
| Pulse width: | 12.0 ms |
| Head application voltage: | 11.0 V |

COMPARATIVE EXAMPLE A-1

When printing was performed on an image-receiving sheet obtained as in Example A-1 except for changing the substrate to a non-foamed white polyethyleneterephthalate film (thickness 100μ, density 1.42, produced by Toray: E-20), the printing density was found to be lower as compared with Example A-1. There was coarseness in the half-tone image, and also color drift of the three colors was observed.

EXAMPLE A-2

A porous polyethyleneterephthalate film having a density of about 80% relative to the density of the non-foamed film (thickness 75μ, density 1.16, produced by Teijin K.K., commercially available as [porous PET]) was used as the substrate, and a composition for formation of an intermediate layer shown below was applied and dried on one surface of this substrate (coating amount after drying 5 g/m$^2$).

| Composition for formation of intermediate layer | |
|---|---|
| Polyester resin (Vylon 200, produced by Toyobo) | 60 parts |
| Polyester resin (Vylon 600, produced by Toyobo) | 40 parts |
| Solvent (methyl ethyl ketone/ toluene = 1/1) | 650 parts |

Subsequently, on the intermediate layer formed as described above, a composition for formation of a receiving layer with the following composition was applied by a Myer bar and dried (coating amount after drying 5 g/m²) to form a receiving layer.

| Composition for forming receiving layer | |
|---|---|
| Polyester resin (Vylon 200, produced by Toyobo) | 70 parts |
| Vinyl chloride-vinyl acetate compolymer (Vinylite VYHH, produced by Union Carbide) | 30 parts |
| Amino-modified silicone (KF-393: produced by Shinetsu Kagaku Kogyo, Japan) | 7 parts |
| Epoxy-modified silicone (X-22-343: produced by Shinetsu Kahaku Kogyo, Japan) | 7 parts |
| Solvent (methyl ethyl ketone/toluene = 1/1) | 700 parts |

Further, on the surface on which a receiving layer was not formed of the substrate having a receiving layer formed thereon, a tackifier (Finetack SPS-1001, produced by Dainippon Ink Kogyo K.K.) was applied and dried (coating amount after drying about 20 g/m²) and caused to adhere onto the release treated surface of a commercially available releasable paper to provide an image-receiving sheet.

As the result of the same printing operation as in Example A-1 on the image-receiving sheet, the image density was high without color drift of the three colors. This sheet was suitable as a decorative label when the releasable paper was peeled off.

COMPARATIVE EXAMPLE A-2

An image-receiving sheet was obtained as in Example A-2 except for changing the substrate to a non-foamed white polyethyleneterephthalate film (thickness 75μ, density 1.42, produced by Toray: E-20). When printing was performed on the sheet in the same manner as in Example A-1, the image density was found to be lower as compared with that in Example A-1. There was coarseness in the half-tone image, and also color drift of the three colors was detected.

EXAMPLE A-3

A foamed polypropylene film having a density of about 69% relative to the density of non-foamed film (thickness 60μ, density 0.62, produced by Toray: Torefan BOYP) was used as the substrate, and, after an urethane type primer was applied and dried thereon, a receiving layer was further provided in the same manner as in Example A-1 ( coated amount after drying 5 g/m²) to provide an image-receiving sheet. When printing was performed on the image-receiving sheet in the same manner as in Example A-1, the printing density was high, and also no drop-out of dots was observable. Furthermore, a good image could be obtained without color drift of the three colors.

EXAMPLE A-4

Image-receiving sheets were obtained as in Example A-1 except for the use of the following composition (A) and a composition to which an anatase type titanium oxide (produced by Titanium Kogyo; KA-10), a benzooxazole type fluorescent brightener (produced by CIBAGEIGY Co.; Uvitex OB), a colorant dye (produced by Nippon Kayaku; Kayaset Blue-N), a red dye (produced by Bayer Co.; Macrolex Red Viotet R) had been added in amounts shown in Table 1.

| Compostion (A) for forming receiving layer | |
|---|---|
| Polyester resin (Vylon 600, produced by Toyobo, Japan) | 6.6 parts |
| Polyvinyl chloride acetate (produced by Denki Kagaku: #1000A) | 9.0 parts |
| Amino-modified silicone oil (produced by Shinetsu kagaku, Japan; X-22-3050C) | 0.3 part |
| Epoxy-modified silicone oil (produced by Shinetsu Kagaku, Japan; X-22-3000E) | 0.3 part |
| Toluene | 42.2 parts |
| Methyl ethyl ketone | 42.2 parts |

L, a and b values of the image-receiving sheets obtained as described above were measured by SM color computer (SM-4CH Model) produced by Suga Testing Machine. The measured values are shown in the following Table 1.

TABLE 1

| No. | White pigment (wt. parts) | Blue dye (wt. parts) | Red dye (wt. parts) | L | a | b | Visual judgement |
|---|---|---|---|---|---|---|---|
| 1 | 0 | 0 | 0 | 94.38 | −0.95 | 2.02 | tinted in yellow |
| 2 | 0 | 0.003 | 0.003 | 90.51 | −0.29 | −3.89 | good white |
| 3 | 0.75 | 0.003 | 0.003 | 92.50 | 0.12 | −3.52 | good white |

EXAMPLE A-5

Two kinds of image-receiving sheets were obtained as in Example A-1 except for the use of the following comopsition (B) and the following composition (C) as the composition for formation of receiving layer, respectively. Also, for comparison, an image-receiving sheet was prepared by the use of the following composition (D).

| Composition (B) for forming receiving layer | |
|---|---|
| Vinyl chloride/2-hydroxyethyl acrylate = 80/20 (each mole) copolymer resin | 2 parts |
| Amino-modified silicone (KF-393: produced by Shinetsu Silicone, Japan) | 0.125 part |
| Epoxy-modified silicone (X-22-343: produced by Shinetsu Siliicone, Japan) | 0.125 part |
| Toluene | 10 parts |
| Methyl ethyl ketone | 10 parts |
| Composition (C) for forming receiving layer | |
| Vinyl chloride/2-hydroxyethyl acrylate maleic acid = 83.6/16/0.4 (each mole) Copolymer resin (Ethlec E-C110, produced by Sekisui Kagaku Kogyo, K.K., Japan) | 2 parts |
| Amino-modified silicone (KF-393: produced by Shinetsu Silicone, Japan) | 0.125 part |
| Epoxy-modified silicone (X-22-343: produced by Shinetsu Silicone, Japan) | 0.125 part |
| Toluene | 10 parts |
| Methyl ethyl ketone | 10 parts |
| Composition (D) for forming receiving layer | |
| Polyester resin (Vylon 200, produced by Toyobo, Japan) | 2 parts |

| -continued | |
|---|---|
| Elvaroy 741<br>(EVA type polymeric plasticizer,<br>produced by Mitsui Polychemical, Japan) | 2 parts |
| Amino-modified silicone<br>(KF-393: produced by Shinetsu<br>Silicone, Japan) | 0.125 part |
| Epoxy-modified silicone<br>(X-22-343: produced by Shinetsu<br>Silicone, Japan) | 0.125 part |
| Toluene | 10 parts |
| Methyl ethyl ketone | 10 parts |

After printing was performed on each image-receiving sheet obtained according to the same method as in Example A-1, weathering resistance test was conducted to obtain the results as shown below in Table 2.

Weathering Resistance Test

Weathering resistance was measured according to JIS L0842, and those with the initial fastness in the second exposure method of JIS L0841 exceeding class 3 were rated as ⊚, and those not satisfying class 3 as x.

TABLE 2

| | Weathering resistance<br>test results |
|---|---|
| B | ⊚ |
| C | ⊚ |
| D | x |

EXAMPLE A-6

As the composition for forming a receiving layer, the following composition (E) was used, and further the composition (F) for comparative purpose, to obtain 3 kinds of image-receiving sheets.

| Composition (E) for forming receiving layer | |
|---|---|
| Polyamide resin<br>(produced by Henkel Hakusuisha:<br>Versamide 744) | 10 parts |
| Amino-modified silicone oil<br>(produced by Shinetsu Kagaku Kogyo:<br>KF-393) | 1 part |
| Epoxy-modified silicone oil<br>(produced by Shinetsu Kagaku Kogyo:<br>X-22-343) | 1 part |
| Toluene | 20 parts |
| Isopropyl alcohol | 20 parts |

After printing was performed on the image-receiving sheet obtained in the same manner as in Example A-1, the relative density was measured by a densitometer RD-918 produced by Macbeth Co., USA. As the result, it was found to be 1.5 for one using the composition (E) and 1.0 for one using the composition (F).

EXAMPLE B-1

By use of a polyester film (thickness $12\mu$) as the substrate, a polyester resin type primer was applied on one surface thereof and dried, which step was followed further by coating and drying of a composition for forming a receiving layer with the following composition to a weight of 7 g/m² after drying.

| Composition for forming receiving layer | |
|---|---|
| Polyester resin (produced by Toyobo, | 100 parts |

| -continued | |
|---|---|
| Composition for forming receiving layer | |
| Vylon 200) | |
| Amino-modified silicone (produced by<br>Shinetsu Kagaku Kogyo, KF-393) | 5 parts |
| Epoxy-modified silicone (produced by<br>Shinetsu Kagaku Kogyo, X-22-343) | 5 parts |
| Solvent (methyl ethyl ketone/toluene/<br>cyclohexanone = 4/2/2) | 900 parts |

The above composition was coated, dried, left to stand for one day and thereafter heated at 100° C. for 30 minutes to permit the silicone to bleed on the surface and thereby to provide a receiving layer having a release layer comprising hardened silicone on the surface.

Next, by the use of a porous polyethyleneterephthalate film having a density of about 72% relative to the density of the non-foamed polyethyleneterephthalate film (thickness $100\mu$, density 1.04, produced by Diafoil K.K.: commercially available as [foamed white polyester film]) as the support, and after coating and drying of an urethane type primer thereon, a weak tackifier (acrylic emulsion, produced by Sekisui Kagaku Kogyo K.K., Esdaine AE-206) was applied by means of a Myer bar and dried to provide a weak tackifier with a dried weight of 4 g/m² thereon, which was then pressure laminated onto a substrate having the above receiving layer formed thereon on the side without a receiving layer formed thereon to provide an image-receiving sheet.

On the receiving layer of the image-receiving sheet, a sublimating transfer film having a sublimatable cyan dye (molecular weight of 250 or more) carried with a binder resin was superposed, heat energy was imparted with a thermal head connected to the electrical signals of the cyan component obtained by color resolution of a face photograph to obtain a cyan image. Subsequently, sublimation transfer was successively performed with a sublimation transfer film by the use of a sublimatable magenta dye (molecular weight of 250 or more) and a sublimation transfer film by use of a sublimatable yellow dye (molecular weight of 250 or more), thus forming a display image comprising the face photography of full color and otherwise letters and figures.

The color image formed by transfer as described above was found to be free of color drift of the three colors and also have ample image density.

After the receiving layer side of the image-receiving sheet having the above image transferred thereon was superposed on the primer-treated surface of a card substrate comprising a white transparent rigid vinyl chloride resin sheet previously subjected to primer treatment with a thickness of $10\mu$, the card substrate and the image-receiving sheet were pressure bonded by heating the image-receiving sheet from the support side by means of hot rollers of 200° C., which step was followed by peel-off of the support, thereby transferring the image transferred onto the image-receiving sheet onto the card substrate.

The surface of the card was found to be smooth as a whole without formation of unevenness by the heat during transfer, and also there was no rising at all at the image portion. Further, the image on the card was free of distortion of the image or interlayer peel-off even in the accelerated test in which it was maintained in an atmosphere of 40° C. for 3 months. Also, when light resistance test was performed by a carbon black lamp, the results were found to be JIS class 4 to 5, thus exhibiting good performance. As to scratching of the surface, etc., good resistance was also exhibited.

COMPARATIVE EXAMPLE B-1

An image-receiving sheet was obtained as in Example B-1 except for the use of a non-foamed white polyester film (thickness 100μ, density 1.45, produced by Toray: E-20) as the support. When a color image was transferred onto the image-receiving sheet in the same manner as in Example B-1, color drift of the three colors was observed and also the image density was low

EXAMPLE B-2

By the use of a cast coated paper (thickness 95μ) as the substrate, a composition for forming an intermediate layer with the following composition was applied and dried to a dry weight of 5 g/m² to form an intermediate layer.

| Composition for forming intermediate layer | |
|---|---|
| Polyester resin (produced by Toyobo: Vylon 600) | 50 parts |
| Polyester resin (produced by Toyobo: Vylon 200) | 50 parts |
| Solvent (methyl ethyl ketone/toluene = 1/1) | 500 parts |

On the intermediate layer was applied and dried the same composition for forming receiving layer as in Example B-1. Then heating was carried out at 100° C. for 30 minutes to form a receiving layer having a hardened silicone layer on the surface.

Next, a porous polyethyleneterephthalate film having a density of about 84% relative to the non-foamed film (thickness 75μ, density 1.22, produced by Teijin K.K.: commercially available as [porous PET]) was provided with a weak tackifier layer thereon in the same manner as in Example B-2 to a dry weight of 3 g/m² and then pressure laminated onto the surface without a receiving layer formed thereon of the substrate having the above receiving layer formed thereon.

When transfer of a color image was carried out onto the image-receiving sheet in the same manner as in Example B-1, the transferred image obtained was found to be free of color drift of the three colors, and also to have ample color density.

EXAMPLE B-3

By the use of a polyethyleneterephthalate film (thickness 9μ) as the substrate, release treatment was applied by coating a solvent solution of an acrylic resin (produced by Mitsubishi Rayon, Dianal BR 85) thereon in a quantity of 1 g/m² (on drying).

Next, on the surface which had been subjected to the release treatment, a composition for forming a receiving layer having the following composition was applied and dried to a dry weight of 6 g/m² to form a receiving layer.

| Composition for forming receiving layer | |
|---|---|
| Polyester resin (produced by Toyobo: Vylon 600) | 70 parts |
| Vinyl chloride-vinyl acetate copolymer (produced by Union Carbide: Vinylite VAGH) | 30 parts |
| Amino-modified silicone (produced by Shinetsu Kagaku Kogyo: KF-393) | 5 parts |
| Epoxy-modified silicone (produced by Shinetsu Kagaku Kogyo: X-22-343) | 5 parts |
| Solvent (methyl ethyl ketone/toluene = 1/1) | 700 parts |

On the other hand, after the same porous polyethyleneterephthalate film as used in Example B-1 was coated with a polyester type adhesive and dried, it was pressure laminated onto surface without a receiving layer of the substrate having the above receiving layer formed thereon to obtain an image-receiving sheet.

When color image transfer was performed in the same manner as in Example B-1, a transferred image without color drift of the three colors, and also with ample image density was obtained. Subsequently, after the sheet was pressure bonded onto the same card substrate as in Example B-1, the support was peeled off. As the result, the surface of the card was found to be smooth as a whole without formation of unevenness by the heat during transfer, and there was no rising at all at the image portion. Further, the image on the card was free of distortion of image or interlayer peel-off even in the accelerated test when maintained in an atmosphere of 40° C. for 3 months. Also, when the light resistance test of JIS with a carbon black lamp was conducted, the results were JIS class 4 to 5, thus indicating good performance. As to scratching of the surface, etc., good resistance was also exhibited.

EXAMPLE C-1

A sheet substrate comprising a transparent polyethyleneterephthalate film with a thickness of 25 μm (produced by Toray: T type) was coated by Myer bar thereon with the following composition for forming image-receiving layer to a dry weight of about 5 g/m² to form an image-receiving layer, followed by aging treatment in an oven 100° C. for 10 minutes.

| Composition for forming image-receiving layer | |
|---|---|
| Polyester resin (produced by Toyobo: Vylon 600) | 12 parts |
| Vinyl chloride-vinyl acetate copolmer (produced by Denki Kagaku Kogyo: 1000A) | 8 parts |
| Amino-modified silicone (produced by Shinetsu Kagaku Kogyo: KF 393) | 1 part |
| Epoxy-modified silicone (produced by Shinetsu Kagaku Kogyo: X-22-343) | 1 part |
| Methyl ethyl ketone (= 1/1) | 78 parts |

On the other hand, after a release treatment layer of a dry weight of 1 g/m² was formed by coating of a solvent solution of an acrylic resin (produced by Mitsubishi Rayon, Dianal BR85) on a foamed polyethyleneterephthalate sheet with a thickness of 100 μm (produced by Diafoil K.K.: W-900E), a strong tackifier comprising the following composition was coated on the surface thereof to a dry weight of about 18 g/m².

| Strong tackifier | |
|---|---|
| Acrylic tackifier (produced by Toyo Ink: BPS4627-6S) | 40 parts |
| Toluene | 60 parts |

The above sheet substrate surface was laminated in opposed state relative to the strong tackifier layer surface. Then, from the foamed sheet side, a half-cut process extending in a rectangular linear shape of 60 mm ×90 mm to the release treatment layer was applied to obtain an image-receiving sheet.

By the use of this image-receiving sheet and by means of a color video printer (produced by Hitachi Seisakusho: VY-100), a human face was printed out with the video camera input on the image-receiving layer surface corresponding to the rectangular region corresponding to that applied with the half-cut process. In the transfer recording in this case, a clear image with extremely high image density could be obtained.

Next, the foamed sheet within the rectangular region which had been subjected to the half-cut process was removed by peeling, and with a white polyethyleneterephthalate sheet comprising a planar shape of 55 mm×85 mm (thickness 250 μm) placed on the image-receiving sheet portion from which the foamed sheet was removed, the laminate was passed through laminate rolls. Next, sheet portions such as the unnecessary foamed sheet, image-receiving layer, etc. were removed by cutting to prepare an ID card having an image-receiving sheet portion with the above transferred image recorded thereon.

The peel-off resistance strength of the image-receiving sheet portion in this card had ample adhesive strength, i.e., 1.5 kg/1 cm width, and also because sticking of the image-receiving sheet onto the card was performed under in a state with the foamed sheet (support portion) remaining like a brim around the image forming portion, the sheet was firmly flexible with good handling adaptability, whereby sticking was facilitated.

EXAMPLE C-1

In the same manner as in Example C-1, an image receiving layer was formed on the sheet substrate to prepare a part of the image receiving sheet.

On the other hand, a transparent polyethyleneterephthalate film subjected to peeling treatment (produced by Sanei Kagaku Kogyo, K.K.: RFT-25) was laminated on the same foamed sheet as in Example C-1 through an adhesive comprising tile following composition (dry coated amount 3 g/m$^2$).

| Adhesive | |
|---|---|
| Adhesive (produced by Takeda Yakuhin Kogyo: Takelac A540) | 10 parts |
| Curing agent (produced by Takeda Yakuhin Kogyo: A50) | 1 part |

Next, on the above film layer surface, the same strong tackifier as in Example C-1 was formed by coating, and after the film was laminated with the tackifier layer opposed to a part of the sheet substrate of the above image-receiving sheet, a half-cut process which cut the image-receiving layer/polyethyleneterephthalate film/tackifier layer was applied to obtain an image-receiving sheet.

By the use of .the image-receiving sheet obtained, a transferred image was recorded similarly as in Example C-1, and an ID card was prepared by the use thereof.

Also, on this card, a clear transferred image could be obtained similarly as in Example C-1, and also the sticking work at the image-receiving sheet portion was facilitated, and yet the adhesive strength at the image-receiving sheet was also ample.

EXAMPLE D-1

By use of a foamed polyester sheet with a density of 0.7, a thickness of 60 μm and a Bekk smoothness of about 1,2000 sec. and a natural paper (produced by Kanzaki Seishi: "Newtop" thickness about 60μ) as the core material, a sheet comprising a constitution of foamed polyester/natural paper/foamed polyester was prepared. At this time, an adhesive for dry lamination (polyester polyol/isocyanate, coated amount about 3 g/m$^2$) was employed.

After one surface of this sheet was coated with the composition for receiving layer in Example A-1 to a dry coated amount of 4 g/m$^2$, curing was effected at 100° C. for 30 minutes to provide an image-receiving sheet D-1 shown below.

On the other hand, for comparative purpose, image-receiving sheets with the following structures were similarly prepared.

(a) image-receiving layer/foamed PET 60μ/paper 60μ
(b) image-receiving layer/synthetic paper 60μ/paper 60μ/synthetic paper 60μ
D-1: image-receiving layer/foamed PET 60μ/paper 60μ/foamed PET 60μ

As the synthetic paper, FPG #60 produced by Oji-Yuka was employed.

The above four kinds of image-receiving sheets were cut into sizes of 10 cm×10 cm, and curled amounts (environmental curling) were measured under the respective conditions of:

(i): −20° C./60° C. each 8 hours×8 cycles; and
(ii): 40° C. 90% RH×100 hours

Also, printing was performed on the above respective image-receiving sheets cut, and the printed state, particularly the printed state at the light portion (coarseness, namely transfer badness), was observed and curling after printing (printing curling) was measured.

| | D-1 | (a) | (b) |
|---|---|---|---|
| Coarseness | Substantially none | Substantially none | Slightly do |
| Printing curling | 2–3 mm | 4–5 mm | 5–7 mm |
| Environmental curling | 3–5 mm | Unmeasurably wound | 3–5mm |

What is claimed is:

1. A heat transfer sheet for use in thermal transfer recording, comprising:
    a substrate; and
    a dye layer formed on the substrate, said dye layer comprising a dye and a binder, said dye comprising Disperse Yellow 201.

2. The heat transfer sheet according to claim 1, further comprising a heat-resistant lubricating layer formed on a surface of the substrate other than the surface on which said dye layer is formed.

* * * * *

UNITED STATES PATENT AND TRADEMARK OFFICE
CERTIFICATE OF CORRECTION

PATENT NO. : 5,336,660
DATED : August 9, 1994
INVENTOR(S) : Egashira et al.

It is certified that error appears in the above-indentified patent and that said Letters Patent is hereby corrected as shown below:

On the title page , column 1, [54], change "HEAT TRANSFER" to --HEAT TRANSFER SHEET--.

Signed and Sealed this

Eleventh Day of October, 1994

Attest:

BRUCE LEHMAN

*Attesting Officer*  *Commissioner of Patents and Trademarks*